(12) United States Patent
He et al.

(10) Patent No.: US 9,182,955 B1
(45) Date of Patent: Nov. 10, 2015

(54) DATA-DEPENDENT CONTROL FLOW REDUCTION

(71) Applicant: Microsoft Corporation, Redmond, WA (US)

(72) Inventors: Wenlei He, Bellevue, WA (US); Ten Tzen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/298,605

(22) Filed: Jun. 6, 2014

(51) Int. Cl.
*G06F 9/45* (2006.01)

(52) U.S. Cl.
CPC .................... *G06F 8/433* (2013.01)

(58) Field of Classification Search
CPC .......... G06F 8/433; G06F 8/443; G06F 8/445
USPC .................................. 717/153–156
See application file for complete search history.

(56) References Cited

U.S. PATENT DOCUMENTS

| 2002/0095667 | A1* | 7/2002 | Archambault | 717/154 |
| 2008/0229291 | A1* | 9/2008 | Chen et al. | 717/140 |
| 2010/0095286 | A1* | 4/2010 | Kaplan | 717/156 |
| 2010/0325608 | A1* | 12/2010 | Radigan | 717/106 |

FOREIGN PATENT DOCUMENTS

EP 0844557 A1 5/1998

OTHER PUBLICATIONS

"International Search Report & Written Opinion Received for PCT Application No. PCT/US2015/034319", Mailed Date: Aug. 12, 2015, 13 pages.
Debray, et al., "Compiler Techniques for Code Compaction", In ACM Transactions on Programming Languages and Systems, vol. 22, Issue 2, Mar. 1, 2000, pp. 378-415.
Johnson, et al., "Analysis Techniques for Predicated Code", In Proceeding of the 29th Annual IEEE/ACM International Symposium on Microarchitecture, pp. 100-113.
Wang, et al., "Y-Branches: When You Come to a Fork in the Road, Take It", In Proceedings of the 12th International Conference on Parallel Architectures and Compilation Techniques, Sep. 27-Oct. 1, 2003, 56-66 pp.

* cited by examiner

*Primary Examiner* — Anna Deng
(74) *Attorney, Agent, or Firm* — Kevin Sullivan; Aaron Hoff; Micky Minhas

(57) ABSTRACT

A transformation of software control flow to reduce the number of successor blocks in the control flow as well as the number of flow control elements. The control flow after transformation has more streamline code and less data-dependent control flow, which yields better runtime performance, and at the same time maintain functionally equivalent. Software control flow is improved by, for each data-dependent flow control element in the control flow graph, finding value narrowing points that would be sufficient that the exit control flow selected by that flow control element would be deterministic. The control flow is modified such that the control flow leads (without passing through the flow control element) from that found value narrowing point to the identified control flow that would be selected given the found value narrowing point. This method may be repeated proceeding from one flow control element to the next.

20 Claims, 13 Drawing Sheets

| Cyclic Unrolling | Original Source Code | Equivalent Code After Transform |
|---|---|---|
| | ```
x = 0;
while (1) {  // loop check is in
             pre_code/post_code
    pre_code();
    if (x == 0) {
        code_x_0();
        x = 1;
    }
    else {
        code_x_1();
        x = 0;
    }
    post_code();
}
``` | ```
x = 0;
while (1){
    pre_code();
    code_x_0();
    x = 1;
    post_code();
    pre_code();
    code_x_1();
    x = 0;
    post_code();
}
``` |

*Figure 9*

|  | Original Source Code | Equivalent Code After Transform |
|---|---|---|
| Loop - Unswitching | ```
while (1) {   // loop check is in
pre_code/post_code
    pre_code();
    switch (x) {
    case 0:
        code_x_0();
        break;
    case 1:
        code_x_1();
        break;
    }
    post_code();
}
``` | ```
switch(x) {
case 0:
    while (1) {
        pre_code();
        code_x_0();
        post_code();
    }
case 1:
    while (1) {
        pre_code();
        code_x_1();
        post_code();
    }
}
``` |

*Figure 10*

| | Original Source Code | Equivalent Code After Transform |
|---|---|---|
| If – Loop Exchange For Ranges | ```
while (...) {
    pre_code();
    if (x == 0) {
        code_x_0();
    }
    else if (x > 10 && x < 20) {
        code_x_1();
    }
    else {
        code_x_2();
    }
    post_code();
}
``` | ```
if (x == 0) {
    while (...){
        pre_code();
        code_x_0();
        post_code();
    }
}
else if (x > 10 && x < 20) {
    while (...){
        pre_code();
        code_x_1();
        post_code();
    }
}
else {
    while (...){
        pre_code();
        code_x_2();
        post_code();
    }
}
``` |

*Figure 11*

|  | Original Source Code | Equivalent Code After Transform |
|---|---|---|
| Hoisting | ```
x = 0;
while (...) {
    pre_code();
    if (x == 0) {
        Code_x_0();
        x = 1;
    }
    else{
        code_x_1();
    }
    post_code();
}
``` | ```
x = 0;
pre_code();
Code_x_0();
post_code();
x = 1;
while (...) {
    pre_code();
    code_x_1();
    post_code();
}
``` |

*Figure 12*

| | Original Source Code | Equivalent Code After Transform |
|---|---|---|
| Switch Loop Shrinking | ```
x = 0;
while (1) {  // loop check is in
pre_code/post_code
    pre_code();
    switch (x) {
    case 0:
        code_x_0();
        x = 1;
        break;
    case 1:
        code_x_1();
        x = 0;
        break;
    }
    post_code();
``` | ```
x = 0;
while (1) {
    pre_code();
    code_x_0();
    x = 1;
    post_code();
    pre_code();
    code_x_1();
    x = 0;
    post_code();
}
``` |

*Figure 13*

DATA-DEPENDENT CONTROL FLOW REDUCTION

BACKGROUND

Computing systems and associated networks have revolutionized the way human beings work, play, and communicate. Nearly every aspect of our lives is affected in some way by computing systems. The functionality of a computing system is largely driven by the instructions that are executed by the one or more processors of the computing system. Such instructions are often referred collectively referred to as "software".

Software is often originally generated using source code in programming languages that have semantics that are more easily interpretable and drafted by a human being. Compilers and interpreters have the task of converting that software from source code to machine code, which is directly interpretable by processors. Sometimes, there are several stages of compilation in which source code is first converted into intermediate code that is relatively independent of the runtime platform, and then once the runtime platform is known or used to execute that code, the intermediate code is converted into machine code.

In order to generate a concept for a logical control flow of the software, the compiler often generates a control flow graph that logically represents all, or at least most, of the possible execution flows that might occur. Furthermore, the compiler attempts to perform software optimization so as to make execution of the software faster and more efficient at runtime without adversely changing the logic performed by the software at runtime.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the improvement of the control flow of a software program. As an example, the control flow may be improved by a compiler at compile time or by some other control flow graph analyzer.

The control flow is improved by traversing the control flow graph corresponding to the control flow of the software program until a flow control element (e.g., a conditional branch or a jump table) is detected that specifies multiple exit control flows that might be taken at runtime depending on a value of a parameter (also called herein a "flow driving parameter") at runtime. Then, value narrowing points are sought out prior to the flow control element in the control flow graph at which the value of the flow driving parameter may be sufficiently determined such that the identity of the exit control flow to be chosen by the flow control element is deterministic. Then, the control flow is modified such that, for each found value narrowing point, the control flow leads (without passing through the flow control element) from that found value narrowing point to the identified exit control flow that would be selected. This method may be repeated for all flow control elements to thereby complete one pass of the control flow. This pass through the control flow may likewise be iteratively performed to further improve the control flow upon each pass.

Surprisingly, this procedure may be used to perform a wide variety of improvements of the control flow. For instance, the procedure may be used to perform control equivalency reduction, and if-loop exchange. However, even more complex improvements may be performed using that same procedure, such as what is referred to herein as "cyclic loop unrolling" and "switch loop shrinking".

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 9 illustrates code in which application of the method described herein results in a control flow reduction technique called "cyclic loop unrolling" to be performed on the control flow;

FIG. 10 illustrates code in which application of the method described herein results in a control flow reduction technique called "loop unswitching" to be performed on the control flow;

FIG. 11 illustrates code in which application of the method described herein results in a control flow reduction technique called "if-loop exchanges" to be performed on the control flow;

FIG. 12 illustrates code in which application of the method described herein results in a control flow reduction technique called "hoisting" to be performed on the control flow; and FIG. 13 illustrates code in which application of the method described herein results in a control flow reduction technique called "switch loop shrinking" to be performed on the control flow.

DETAILED DESCRIPTION

At least some embodiments described herein relate to the improvement of the control flow of a software program. As an example, the control flow may be improved by a compiler at compile time or by some other control flow analyzer.

The control flow is improved by traversing the control flow graph corresponding to the control flow of the software program until a flow control element (e.g., a conditional branch or a jump table) is detected that specifies multiple exit control flows that might be taken at runtime depending on a value of a parameter (also called herein a "flow driving parameter") at runtime. Then, value narrowing points are sought out prior to the flow control element in the control flow graph at which the value of the parameter may be sufficiently determined such that the identity of the exit control flow to be chosen by the flow control element is deterministic. Then, the control flow is modified such that, for each found value narrowing point, the control flow leads (without passing through the flow control element) from that found value narrowing point to the identified exit control flow that would be selected. This method may be repeated for all flow control elements to thereby complete one pass of the control flow. This pass through the control flow may likewise be iteratively performed to further improve the control flow upon each pass.

Surprisingly, this procedure may be used to perform a wide variety of improvements of the control flow. For instance, the procedure may be used to perform control equivalency reduction, and if-loop exchanges. However, even more complex improvements may be performed using that same procedure, such as what is referred to herein as "cyclic loop unrolling" and "switch loop shrinking".

Some introductory discussion of a computing system will be described with respect to FIG. 1. Then, the improvement of software programs using the principles described herein will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
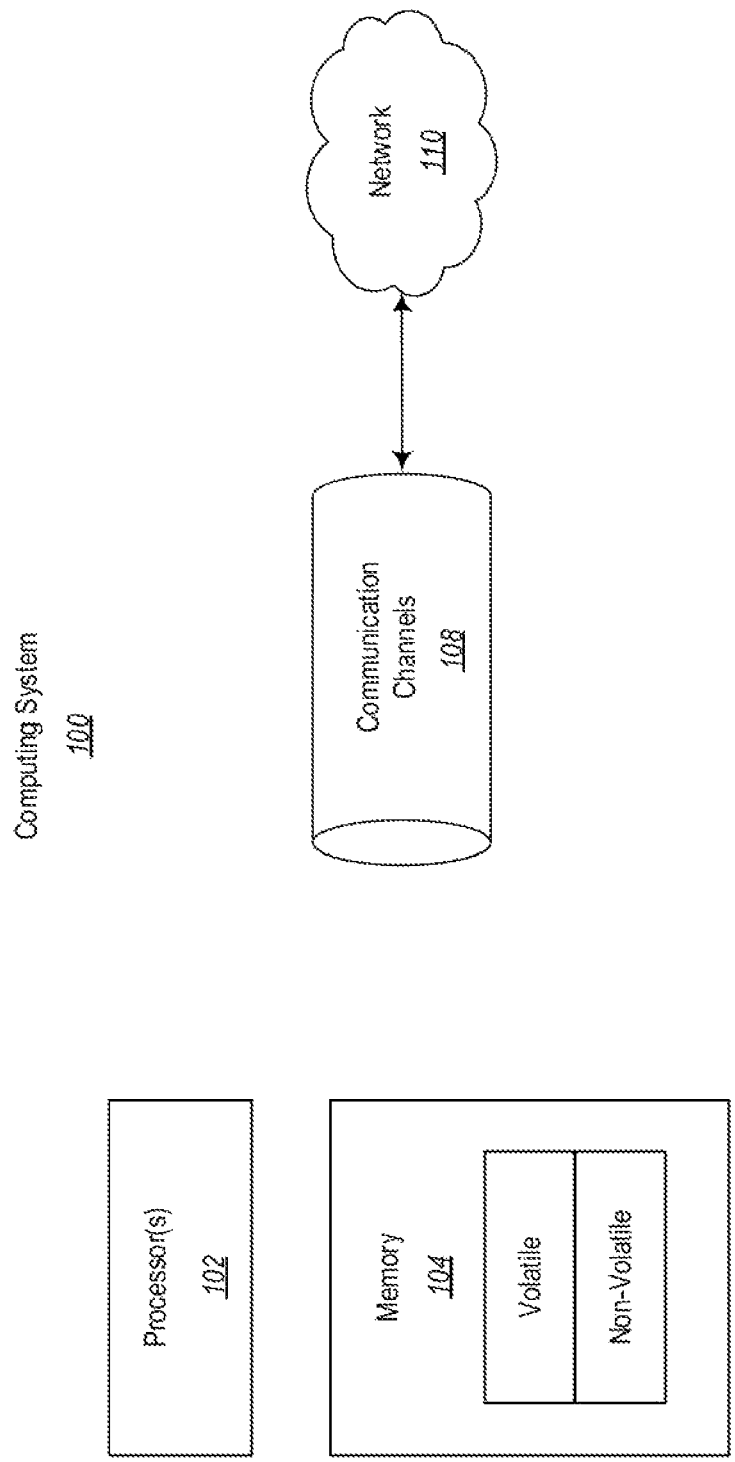
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
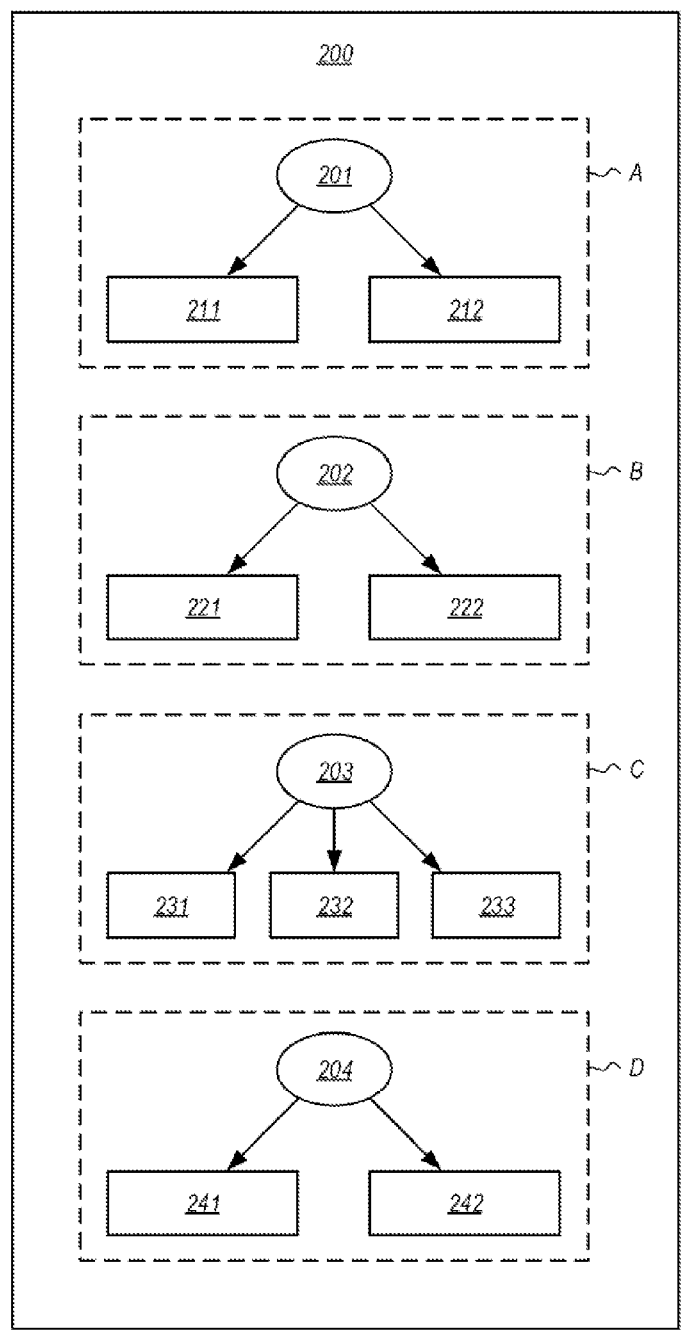
FIG. 2 abstractly illustrates a software program that includes multiple flow control elements, each controlling the flow of execution control into one of multiple control flows depending on a value of a flow driving parameter.

FIG. 2 abstractly illustrates a software program 200 that includes multiple flow control elements. For instance, the software program 200 is illustrated as including four flow control elements 201 through 204. However, the principles described herein apply to improve the control flow of software programs regardless of the number of flow control elements within the software program. An example of a flow control element is a conditional branch element or a jump table.

At runtime, each flow control element would direct execution through one of multiple possible exit control flows (e.g., via exit control flow edges to a connected successor block) depending on a value of a parameter (hereinafter also referred to as a "flow driving parameter") as that value existed when the flow control element was encountered. The term "exit control flow" is distinct from the term "control flow". The term "control flow" references the flow of control of the entire program, whereas the "exit control flow" references one of multiple paths that could be selected by a flow control element to pass control to (e.g., via exit control flow edges to a connected successor block). The principles described herein are not limited to any particular number of exit control flows branching from a flow control element. However, for mere purposes of providing an example only, the flow control element 201 is illustrated as directing execution to two exit control flows 211 and 212 depending on a value of its flow driving parameter, flow control element 202 is also illustrated as directing execution to two exit control flows 221 and 222 depending on a value of its flow driving parameter, flow control element 203 is illustrated as directing execution to three exit control flows 231 through 233 depending on a value of its driving parameter, and flow control element 204 is illustrated as directing execution to two exit control flows 241 and 242 depending on a value of its driving parameter.

The example software program 200 of FIG. 2 is simplified in order to provide a simple example that may be referred to throughout this description without requiring the reader comprehend more complex examples. However, the principles described herein may be applied to any software program, regardless of complexity. For instance, a software program may literally have thousands of flow control elements contained therein. Furthermore, in FIG. 2, the example software program 200 is simplified by having all of the flow control elements being serially positioned in which all of the exit control flows for each flow control element are completed prior to the next flow control element being encountered. However, a typical software program might include a complex hierarchy of flow control elements, in which one flow control element (i.e., a child flow control element) may actually appear within a particular exit control flow of another flow control element (i.e., a corresponding parent flow control element). The principles described herein may apply also to such software programs having complex hierarchies of flow control elements.

The principles described herein improve software programs by equivalently transforming the program control flow to reduce the number of successor blocks for each basic block in control flow as well as the number of flow control elements within a software program. Accordingly, at runtime, the runtime environment need not spend processing or other computing resources navigating the flow control element. For instance, in runtime environments that attempt to improve performance by predicting beforehand which exit control flow of a flow control element the execution will likely take, the runtime environment need not expend resources making the prediction, such as by compensating the instruction cache miss, or reverting speculative execution in case of an incorrect prediction.

In the example computer program 200 of FIG. 2, the compiler, analyzer, or any other logical analysis tool would create a control flow graph of the computer program 200. The control flow graph is an in memory representation of a computer program that breaks the computer program down into a flow of basic block, that is—a set of basic blocks connected by control flow edge. Examples of real control flow graphs corresponding to simple real computer program code will later be described. However, for now, the description continues to describe the computer program 200 in abstract terms.

Figure 3:
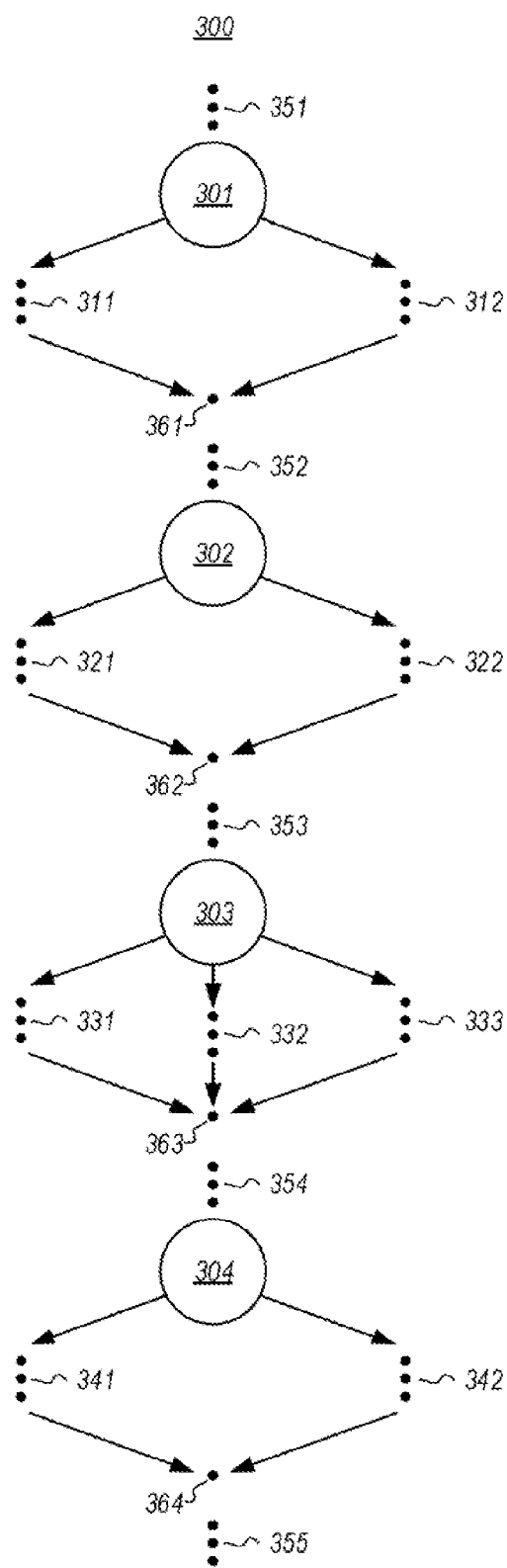
FIG. 3 abstractly illustrates a flow graph corresponding to the software program of FIG. 2.

Of course, the structure of a control flow graph will depend strictly on the sequence of operations of the corresponding software program. Nevertheless, the structure of a control flow graph corresponding to software program 200 will now be described with respect to FIG. 3. FIG. 3 abstractly illustrates a control flow graph 300 corresponding to the software program 200 of FIG. 2. The compiler, analyzer, or other logical analysis tool may create the control flow graph 300 for the software program 200, or otherwise access the control flow graph 300 that corresponds to the software program 200.

The logical analysis tool (e.g., the compiler or analyzer) would first see a flow of execution through zero or more flow graph elements as represented by the vertical ellipses 351. The "flow graph elements" are basic blocks or control flow edges as those terms are used in the art of compiler technology. Referring to the software program 200, this would be the control operations that occur prior to the flow control element 201. Moving through the control flow graph, the logical analysis tool would then encounter a flow control element 301, which represents the flow control element 201 of the software program. The flow control element 301 branches execution into two exit control flows (each represented by vertical ellipses 311 and 312) and each including a series of one or more flow graph elements. The exit control flows 311 and 312 of FIG. 3 are examples of the exit control flows 211 and 212 of FIG. 2. The control flow graph would be joined at the end of the exit control flows as represented by the joining junction 361.

The logical analysis tool (e.g., the compiler or analyzer) would then see a flow of execution through zero or more flow graph elements as represented by the vertical ellipses 352. Moving through the control flow graph, the logical analysis tool would then encounter a flow control element 302, which represents the flow control element 202 of the software program. The flow control element 302 branches execution into two exit control flows (each represented by vertical ellipses 321 and 322) and each including a series of one of more flow graph elements. The exit control flows 321 and 322 of FIG. 3 are examples of the exit control flows 221 and 222 of FIG. 2. The control flow graph would be joined at the end of the exit control flows as represented by the joining junction 362.

The logical analysis tool (e.g., the compiler or analyzer) would then see a flow of execution through zero or more flow graph elements as represented by the vertical ellipses 353. Moving through the control flow graph, the logical analysis tool would then encounter a flow control element 303, which represents the flow control element 203 of the software program 200. The flow control element 303 branches execution into three exit control flows (each represented by vertical ellipses 331, 332 and 333) and each including a series of one of more flow graph elements. The exit control flows 331, 332 and 333 of FIG. 3 are examples of the exit control flows 231, 232 and 233 of FIG. 2. The control flow graph would be joined at the end of the exit control flows as represented by the joining junction 363.

The logical analysis tool (e.g., the compiler or analyzer) would then see a flow of execution through zero or more flow graph elements as represented by the vertical ellipses 354. Moving through the control flow graph, the logical analysis tool would then encounter a flow control element 304, which represents the flow control element 204 of the software program 200. The flow control element 304 branches execution into two exit control flows (each represented by vertical ellipses 341 and 342) and each including a series of one of more flow graph elements. The exit control flows 341 and 342 of FIG. 3 are examples of the exit control flows 241 and 242 of FIG. 2. The control flow graph could potentially be joined at the end of the exit control flows as represented by the joining junction 364. The logical analysis tool would then see a flow of zero of more flow graph elements as represented by the vertical ellipses 355.

Figure 4:
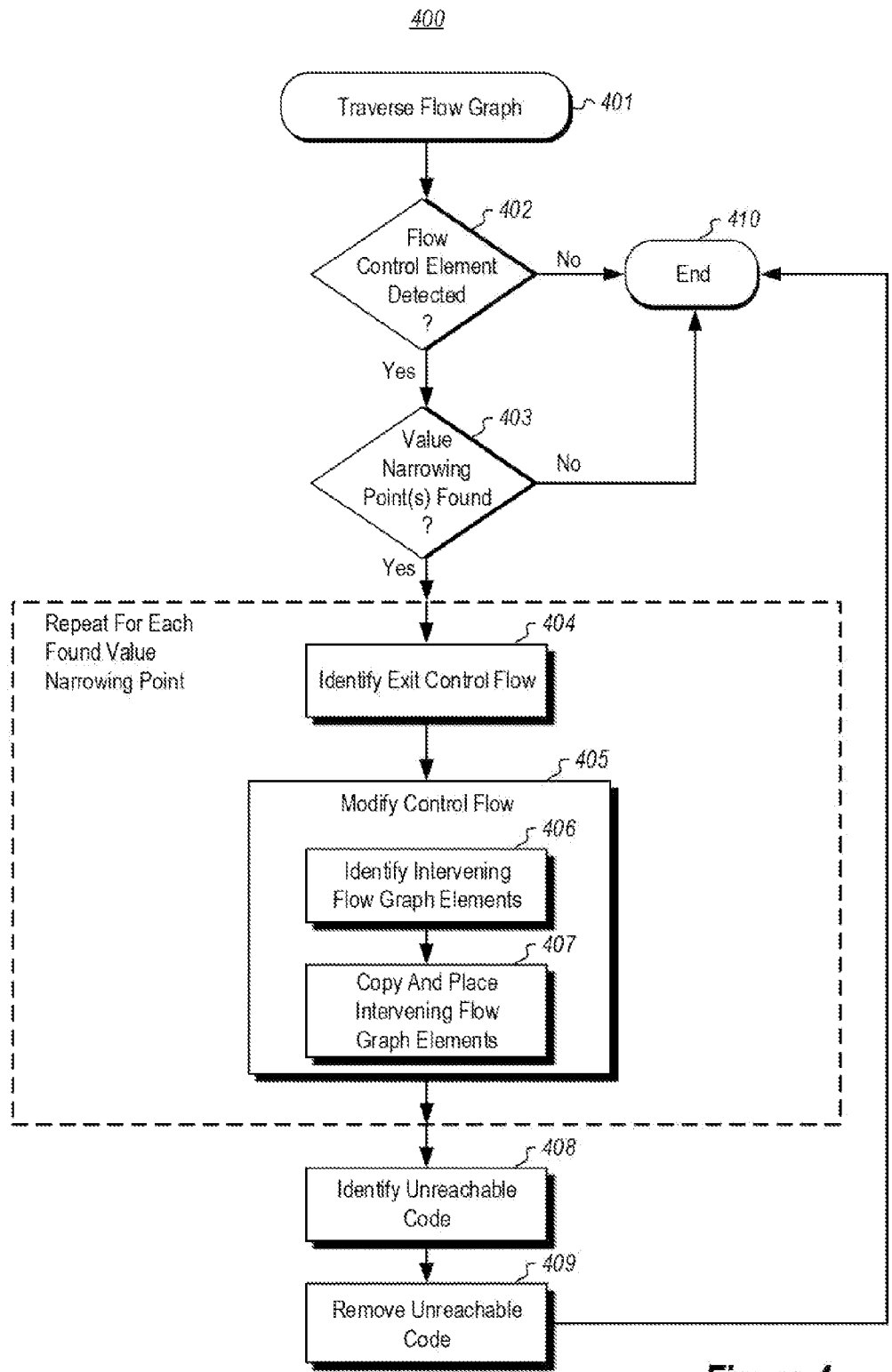
FIG. 4 illustrates a flowchart of a method for optimizing a control flow of a software program.

FIG. 4 illustrates a flowchart of a method 400 for optimizing a control flow of a software program. The method 400 may be performed by the computing system 100 of FIG. 1 in response to the computing system accessing a computer program product comprising one or more computer-readable storage media and executing one or more computer-executable instructions stored thereon to thereby instantiate and/or operate a flow graph analysis tool, such as a compiler.

The method 400 may be performed on multiple portions of the control flow graph, in which the portions are defined as being initiated by a flow control element and ending at the next flow control element. Each time the method 400 is performed, there is an opportunity for the flow control element to be entirely eliminated (through full reduction) or partially eliminated (through partial reduction). Once the flow graph analysis tool completes one pass of the control flow graph to perform one iteration of reduction in the number of flow control elements, the pass may be performed again, and again, iteratively, until the control flow converges (no more reduction can apply) or a desired level of flow control element reduction is achieved. In general, the more the number of flow control elements that are removed from the program, the larger the program becomes, but the more efficiently the software program runs at runtime. Accordingly, the desired level of reduction is a balance between software program size and improved runtime performance. The method 400 may be performed on any software program regardless of the complexity of the flow graph. Nevertheless, the method 400 will now be described with respect to the control flow 300 of FIG. 3 and the software program 200 of FIG. 2.

For instance, the method 400 might first be performed on the portion A of the software program 200. Portion A corresponds to the flow graph elements 351, 301, 311 and 312 of the flow graph 300 of FIG. 3. The method 400 involves traversing the control flow graph of the software program (act 401) until an eligible flow control element is detected ("Yes" in decision block act 402).

In this description and in the claims, an "eligible" flow control element is a flow control element that specifies multiple exit control flows that might be taken at runtime depending on a value of a parameter at runtime. In other words, the eligible flow control element is one that has a flow driving parameter, and thus is one that could be subject to partial or full removal by using the method 400 to attempt to find a value narrowing of that flow driving parameter sufficient that the exit control flow that would be selected by the flow control element is deterministic.

The control flow graph analyzer may traverse through the control flow graph to find the flow control elements in any manner as the order of traversal to find the flow control elements is not important. The end goal is to find the flow control elements within the flow control graph. For instance, the control flow graph may be forward depth-first traversed from graph entry to graph exit, backward depth-first traversed from graph exit to graph entry, linearly traversed in the intermediate representation used by the compiler, or any other possible traversal order. However, in the example that follows, the control flow graph 300 will be described as being forward traversed to find the flow control elements.

For instance, in the case of forward traversal, the control flow graph analyzer would traverse through the zero or more flow graph elements 351 until the flow control element 301 is encountered that branches into two possible series 311 and 312 of one or more flow graph elements, depending on the value of its flow driving parameter as it would be at runtime upon encountering flow control element 301.

In response to detecting such an eligible flow control element ("Yes" in decision block 402), the flow graph analyzer attempts (decision block 403) to find a value narrowing point in the control flow graph prior to the flow control element. In this description and in the claims, a "value narrowing point" with respect to a flow driving parameter is a flow graph element in which the value of the flow driving parameter is sufficiently determined such that the identity of the exit control flow to be chosen by the flow control element is deterministic. For instance, suppose the flow driving parameter is "x", and the flow control element specifies that if x is greater than 0, then one exit control flow is selected, and if not, then the other exit control flow is selected. In that case, a valid value narrowing point is any logic that allows for an inference that "x" cannot be a negative number or that "x" can only be a negative number (even though the exact value of "x" at runtime cannot be determined). If such a value narrowing point is not found ("No" in decision block 403), then no reduction of the flow control element will be performed (end 410), at least upon this pass of the control flow.

For instance, the search for the value narrowing point may be performed by depth-first backward traversing the flow control graph starting from the flow control element until an uninitialized definition of the flow driving parameter is found or no setting of the value (that can be found by static analysis)

is found at the definition or anywhere in-between the definition and the flow control element within the control flow graph. In that case, it is not possible to identify what the value of the flow driving parameter would be at the flow control element, and thus no reduction of the flow control element occurs. For instance perhaps the flow driving parameter is not a local variable, but rather a global variable that is defined outside the scope of the software program, or the flow driving parameter is aliased so that it can be changed anytime unless the analysis can prove otherwise. If a setting of the value is found that is not statically known, the traverse on that path would also stop. This is because this unknown setting basically eliminate the possibility of having a deterministic flow control element.

Alternatively, there might be a backward traversal limit defining a maximum amount that the control flow graph should be backward traversed without finding a value narrowing point for the flow driving parameter. This backward traversal limit is set using a balance between the expense of processing resources required to find a potential value narrowing point and the benefit and likelihood of finding a value narrowing point upon further backward traversal of the control flow graph. If there is a valid value narrowing point, but that value narrowing point lies beyond that backward traversal limit, it might still be possible in some subsequent pass of the software program to find that value narrowing point since the very structure of the control flow graph changes on each pass of the control flow graph.

Upon the first performance of the method 400 with respect to the software program 200 (assuming forward traversal), the method 400 is performed with respect to portion A of the software program 200. In this case, the flow graph analyzer may backward traverse in depth-first order from the flow control element 301 through the zero or more flow graph elements 351 and find no value narrowing points ("No" in decision block 403), thereby resulting in completion (act 410) of the method 400 with respect to the portion A of the software program 200.

The method 400 may then be repeated with respect to the portion B of the software program 200. Again, the flow graph 300 would be forward traversed (act 401) through the flow graph elements 311, 312 and 352 until the flow control element 302 is encountered ("Yes" in decision block 402). The analyzer would then backwards traverse the control flow graph in depth-first order in an attempt (decision block 403) to find a corresponding value narrowing point for the flow driving parameter of the flow control element 402.

In this case, suppose that there is such a value narrowing point found ("Yes" in decision block 403). In that case, the analyzer would identify the exit control flow path (act 404) that would be taken given the found value narrowing point. Then, the control flow would be modified (act 405) such that the control flow from the found value narrowing point leads to the identified exit control flow without traversing the flow control element. For instance, this may be performed by identifying an intervening control flow of one or more flow element in the flow graph that is between the found value narrowing point and the identified exit control flow (act 406) and adding the intervening flow (act 407) in the flow graph from the found value narrowing point to the identified exit control flow.

For instance, referring to FIG. 3, suppose the control flow 321 is taken based on the value set for the flow driving parameter at the found value narrowing point. Wherever that value narrowing point is, all of the intervening flow graph elements between the value narrowing point and the flow control element 302 (excluding the flow control element 302) would be copied and placed (act 407) to lead from the value narrowing point to the identified exit control flow 321.

The acts 404 and 405 might be repeated for each found value narrowing point for the value. This might be possible in situations in which value narrowing points are found in alternative execution paths. For instance, in FIG. 3, suppose there is one value narrowing point within the flow graph elements 311 that sets the value for the flow driving parameter used by the flow control element 302 such that the flow control element would select the control flow 321. In that case, the intervening flow graph elements between that first value narrowing point and the flow control element 302 would be copied to instead flow from that first value narrowing point to the identified exit control flow 321. In addition, suppose there is a second value narrowing point within the flow graph elements 312 that sets the value for the parameter used by the flow control element 302 such that the flow control element would select the exit control flow 322. In that case, the intervening flow graph elements between that second value narrowing point and the flow control element 302 would be copied to instead flow from that second value narrowing point to the control flow 322.

Optionally, if the modification of the control flow graph resulted in one or more unreachable flow graph elements, the unreachable flow graph elements may be identified (act 408) and removed (act 409) from the flow graph. Conventional technology may be employed to find and remove some types of unreachable flow graph elements. The removal of unreachable flow graph elements is optional. However, even when performed, the timing of the removal of the unreachable flow graph elements is also flexible. For instance, the unreachable flow graph elements could be sought after and removed each time a value narrowing point is found and the control flow graph correspondingly modified. Alternatively or in addition, the unreachable flow graph elements could be sought after and removed each time the method 400 is performed after the control flow graph has been modified for all value narrowing points found corresponding to a flow control element. Alternatively or in addition, the unreachable flow graph elements could be sought after and removed with each pass of the entire software program. Alternatively or in addition, the unreachable flow graph elements could be sought after and removed after all passes of the software program when a desired improvement of the software program has been reached. In this description and in the claims, the term "flow graph elements" and "control flow elements" is the same.

After the control flow graph is modified for all of the value narrowing points found for the flow control element (after act 405), or after the unreachable flow graph elements are found and removed (acts 408 and 409), the method 400 ends (act 410) for that portion of the software program.

The method 400 may then be performed for the next portion of the software program. For instance, the method 400 would then be performed for portion C of the software program 200. Again, the analyzer forward traverses (act 401) through the control flow graph (e.g., through flow graph elements 321, 322 and 353) until the flow control element 303 is encountered ("Yes" in decision block 402). Suppose here that two value narrowing points are found (two instance of "Yes" in decision block 403). Suppose a first value narrowing point is found amongst the flow graph elements 321 and sets the value of the corresponding flow driving parameter such that exit control flow 332 would be followed. In that case, the intervening flow graph elements between the first value narrowing point and the flow control element 303 is copied and placed to be from the first value narrowing point to the identified exit control flow 332. Suppose that a second value narrowing point is found amongst the control graph elements 352 and sets a value such that the exit control flow 331 would be followed. In that case, the intervening flow graph elements between the second value narrowing point and the flow control element 303 is copied and placed to instead be from the second value narrowing point to the identified exit control flow 331. Suppose that a third value narrowing point is found amongst the control graph elements 322 and sets a value such that the exit control flow 331 would be followed. In that case, the intervening flow graph elements between the third value narrowing point and the flow control element 303 is copied and placed to be from the third value narrowing point to the identified exit control flow 331.

Note in this example that no value narrowing point was found setting a value of the flow driving parameter that would cause the exit control flow 333 to be followed. That does not mean that exit control flow 333 would not be used at runtime. However, if there is a situation in which the analyzer knows that the value must be set deterministically one of a set of values depending on runtime flow, and none of those sets of values would result in exit control flow 333 being selected, the flow graph elements 333 may be eliminated without affecting the logic performed by the software program.

The method 400 is then performed with respect to portion D of the software program 200. The analyzer then again proceeds to forward through the control flow graph (act 401), and encounters flow control element 304 ("Yes" in decision block 402). A value narrowing point is then sought out scanning backwards in depth-first order through the flow graph. Suppose that just one value narrowing point is found in control flow 311, which resulted in a value of the flow driving parameter that would cause exit control flow 341 to be selected by the flow control element 304. In that case, the intervening flow graph elements between that value narrowing point and the flow control element 304 may be copied and placed to be directly between the found value narrowing point and the identified exit control flow 341. In this case, the flow control element 304 may not be removed entirely in act 408 as it may not be concluded as unreachable (since it might still be reached by taking control flow 312).

Upon the next performance of the method 400, the analyzer reaches the end of the control flow without reaching another flow control element ("No" in decision block 402), thereby ending the method 400 quickly (act 410). Portion D being the last portion of the software program 200, that concludes the first forward pass of the software program 200. The flow graph and control flow is now different than it was at the beginning of the first forward pass of the flow graph, and the number of flow control elements has been reduced. Accordingly, the next forward pass of the software program will be dealing with a different flow graph, albeit without changing the functionality of the software program.

Note that this example was quite simple as there was no hierarchical structure of flow control elements. If there were a hierarchical structure of flow control elements, then performing forward traversal of the flow graph would take into consideration the position of the hierarchy that the traversal is in. For instance, if the traversal is on a first level of the hierarchy and within one of two possible control flows of that first level in the hierarchy, the forward traversal would keep track that it need to forward traverse through the second possible control flow of that first level in the hierarchy once the traversal of the first control flow of that first level of the hierarchy is completed. This tracking may be recursively performed such that in forward traversal, all branches of the hierarchy are traversed.

The method 400 will now be described with respect to an actual code. In this example, the applicable of the method to the flow graph in the code results in a control flow reduction technique called "control equivalency reduction" to be performed on the flow graph.

For instance, suppose the following code is to be subject to a pass by performing the method 400 with respect to its multiple portions (line numbering added for clarity in subsequent referencing):

1. void func(int x){
2. int y;
3. if (x>0){
4. foo( );
5. y=1;
6. }
7. else {
8. bar( );
9. y=0;
10. }
11. baz( );
12. if (y==1){
13. foo2( );
14. }
15. else {
16. bar2( );
17. }
18. }

Figure 5:
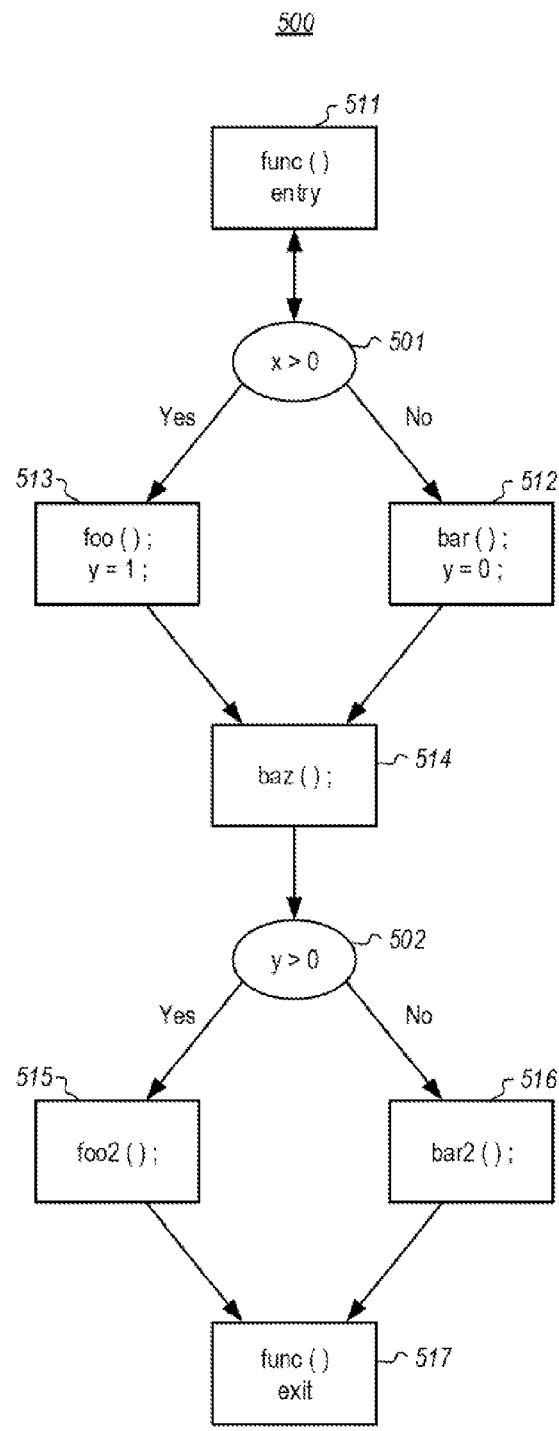
FIG. 5 illustrates a control flow graph that results from a first example of code in which a control flow reduction technique called "control equivalency reduction" may be performed.

FIG. 5 illustrates a resulting flow graph 500. Note that there are two flow control elements 501 and 502, and several other flow graph elements 511 through 517. Forming a control flow graph from source code is known in the art. However, for purposes of explanation, flow graph element 511 semantically corresponds to lines 1 and 2 in the source code. Flow graph element 501 semantically corresponds to line 3 in the source code. Flow graph element 512 semantically corresponds to lines 8 and 9 of the source code. Flow graph element 513 semantically corresponds to lines 4 and 5 of the source code. Flow graph element 514 semantically corresponds to line 11 of the source code. Flow graph element 502 semantically corresponds to line 12 of the source code. Flow graph element 515 semantically corresponds to line 13 of the source code. Flow graph element 516 semantically corresponds to line 16 of the source code. Flow graph element 517 semantically corresponds to line 18 of the source code.

In the case of forward traversal to find flow control elements, the method 400 would begin forward traversing (act 401) the flow graph 500 to pass by flow graph element 511 and thereby encounter the flow control element 501 ("Yes" in decision block 402). The flow driving parameter that defines which path the flow control element 501 selects is called "x". Accordingly, the control flow graph is backwards traversed in depth-first order (decision block 403) to see if there is a value narrowing point where the value of "x" is defined. However, in backward traversing, there is only one flow graph element 511. However, the value of "x" simply is not defined in flow graph element 511. Accordingly, a value narrowing point for "x" is not found ("No" in decision block 403), and this performance of the method 400 ends.

Figure 6:
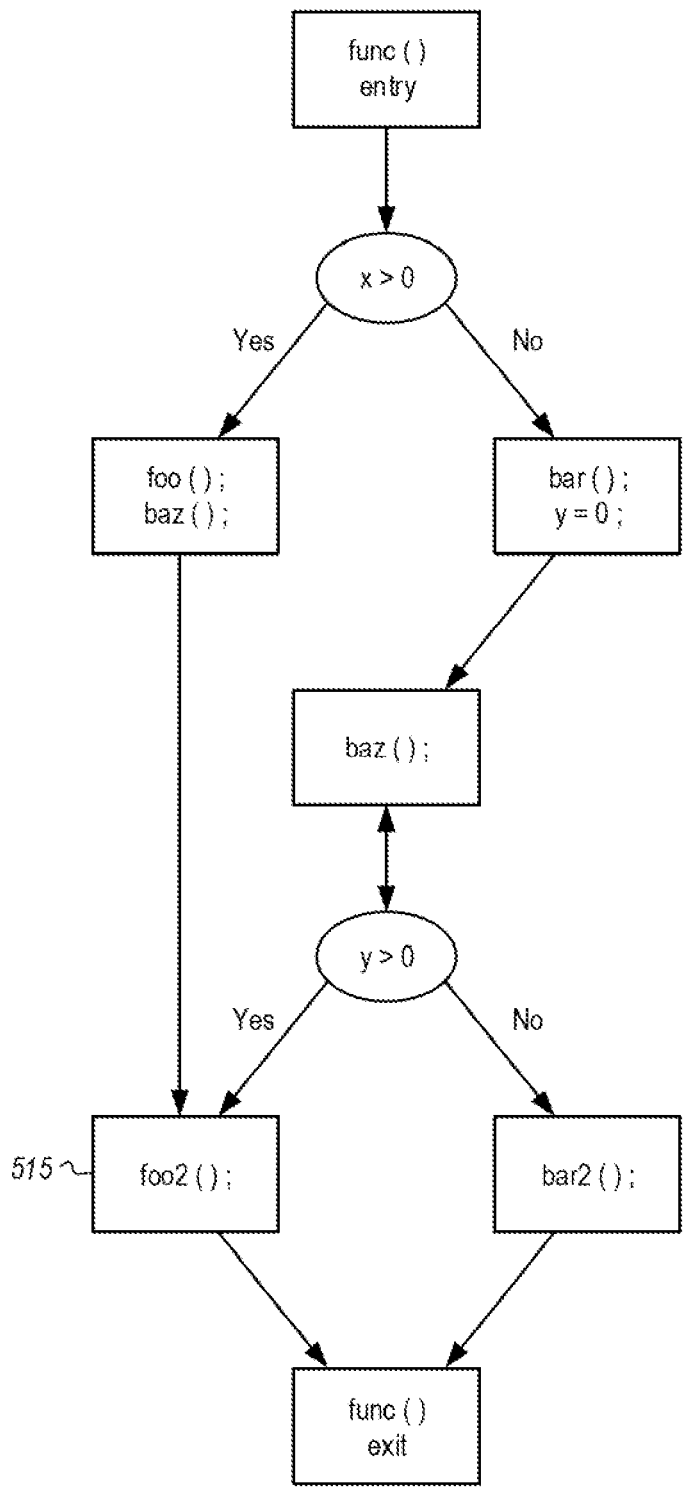
FIG. 6 illustrates the control flow graph of FIG. 5 after having been modified to couple one value narrowing point with the corresponding identified control flow.

The method 400 is then repeated, again resulting in the forward traversing (act 401) of the flow graph. Flow graph elements 512, 513 and 514 are encountered, but these are not flow control elements. Flow control element 502 is then encountered ("Yes" in decision block 402). The flow driving parameter that defines the selected control flow is "y". Accordingly, the flow graph 500 is backward traversed from the flow control element 502 in an attempt to find (decision block 403) where there is value of "y" set and held. Flow graph element 514 is evaluated and determined not to set or change a value of "y". However, the next flow graph element 513, does set the value of "y" at one (1). With a value of one for parameter "y", the flow control element 502 would select the control flow represented by a single flow graph element 515 (act 404). Accordingly, the analyzer would modify (act 405) the flow graph such that the intervening flow graph elements between the value narrowing point and the flow control element (in this case just flow graph element 414) would be copied to instead lead directly from the value narrowing point (in this case flow graph element 513) to the identified exit control flow (in this case flow graph element 515). The resulting control flow graph is illustrated in FIG. 6. Note that the baz function now appears between the foo function and the foo2 function.

Figure 7:
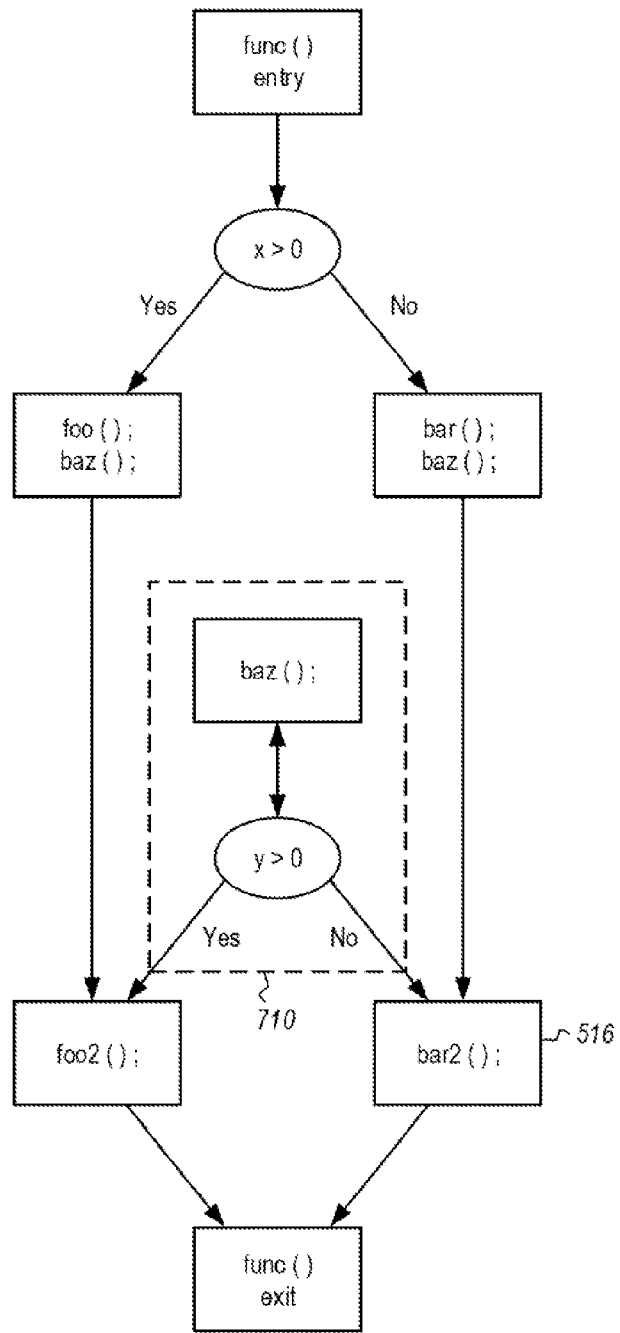
FIG. 7 illustrates the control flow graph of FIG. 6 after having been modified to couple another value narrowing point with its corresponding identified control flow.

Continuing to depth-first backward traverse, the flow graph element 512 is also evaluated and determined again to set the value of "y", but in this case to zero (0). With a value of one for parameter "y", the flow control element 502 would select the control flow represented by a single flow graph element 516 (act 404). Accordingly, the analyzer would modify (act 405) the control flow graph such that the intervening flow graph elements between the value narrowing point and the flow control element (in this case just, flow graph element 514) would be copied to instead lead directly from the value narrowing point (in this case flow graph element 512) to the identified exit control flow (in this case flow graph element 516). The resulting flow graph is illustrated in FIG. 7. Note that the baz function now appears between the bar function and the bar2 function.

Figure 8:
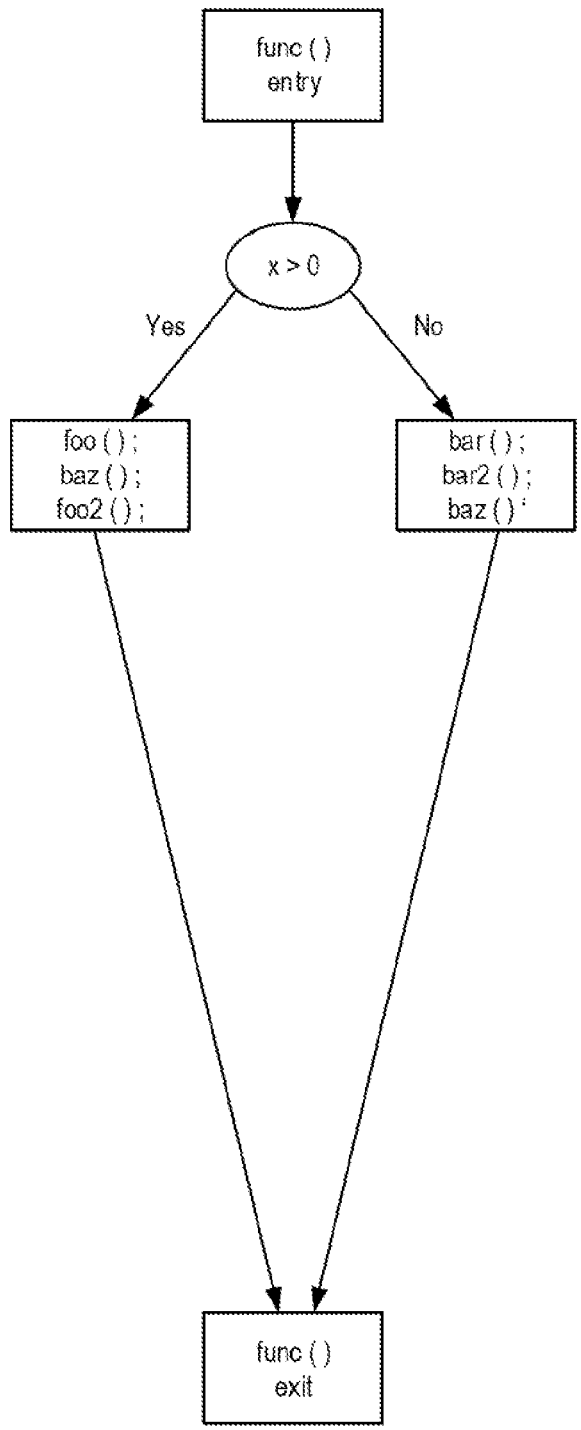
FIG. 8 illustrates the control flow graph of FIG. 7 after unreachable code has been removed.

Upon the next performance of the method 400, flow graph elements 515, 516 and 517 are evaluated, and instead of finding a flow control element, the end of the flow graph is encountered, and thus the method 400, and the first pass ends. As evident from FIG. 7, this results in some unreachable code 710, which may then be removed using conventional mechanisms, resulting in the flow graph of FIG. 8. Note that in this pass, the number of flow control elements was reduced from two to one.

Surprisingly, this forward pass technique using multiple performances of the method 400 for each portion of the control flow graph can perform many types of control flow reductions. The depth-first backward traverse for value narrowing point can go through back edges in control flow graph as well, in which case this technique becomes a type of loop optimization if reduction is performed. For instance, FIG. 9 illustrates the control flow reduction (as represented by source code) when the technique is applied to particular source code and that results in cyclic loop unrolling to be performed on the flow graph. FIG. 10 illustrates the control flow reduction (as represented by source code) when the technique is applied to particular source code and that results in switch loop shrinking, which represented a switch version of loop unswitching, to be performed on the control flow. Thus, this one described technique may thus be used to perform any of these three types of control flow reduction.

FIG. 11 illustrates the control flow reduction (as represented by source code) when the technique is applied to particular source code and that results in if-loop exchanges for ranges to be performed on the flow graph. FIG. 12 illustrates the control flow reduction (as represented by source code) when the technique is applied to particular source code and that results in hoisting to be performed on the flow graph. FIG. 13 illustrates the control flow reduction (as represented by source code) when the technique is applied to particular source code and that results in cycling loop unrolling to be performed on the flow graph.

Accordingly, the principles described herein provide an elegant mechanism to improve code quality of computer executable instructions sequence by reducing the number of successor blocks for each basic block in control flow as well as the number of flow control elements. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage media having thereon computer-executable instructions that are structured such that, when executed by one or more processors of a computing system, cause the computing system to perform a method for improving a control flow of a software program, the method comprising:
    an act of traversing a control flow graph corresponding to the control flow of the software program;
    as a result of the act of traversing, an act of detecting a flow control element that specifies a plurality of exit control flows that might be taken at runtime depending on a value of a parameter at runtime;
    in response to the act of detecting, an act of attempting to find a value narrowing point in the control flow graph prior to the flow control element such that the value narrowing point narrows the value of the parameter sufficiently that an exit control flow that would be selected by the flow control element is deterministic;
    if a value narrowing point is found in the act of attempting to find a value narrowing point, an act of identifying, from the plurality of exit control flows, the exit control flow that would be taken given the found value narrowing point; and
    an act of modifying the control flow such that control flow graph from the found value narrowing point leads to the identified exit control flow without traversing the flow control element.

2. The computer program product in accordance with claim 1, the act of modifying the control flow comprising:
    an act of identifying an intervening flow of one or more flow graph elements in the control flow graph that is between the found value narrowing point and the flow control element excluding the flow control element; and
    an act of adding the intervening flow in the control flow from the found value narrowing point to the identified exit control flow.

3. The computer program product in accordance with claim 1, the act of attempting to find a value narrowing point comprising:
    an act of backward traversing the flow control graph until the value narrowing point is found.

4. The computer program product in accordance with claim 1, the act of attempting to find a value narrowing point comprising:
    an act of backward traversing the flow control graph until a definition with a statically known value of the parameter is found.

5. The computer program product in accordance with claim 1, the act of attempting to find a value narrowing point comprising:
    an act of backward traversing the flow control graph until a backward traversal limit is encountered.

6. The computer program product in accordance with claim 1, the found value narrowing point being a first value narrowing point, the identified exit control flow being a first identified exit control flow, wherein if a second value narrowing point is found in the act of attempting to find a value narrowing point, the method further comprises:
- an act of identifying, from the plurality of exit control flows, a second exit control flow that would be taken given the second value narrowing point; and
- an act of modifying the control flow graph such that the flow graph from the second value narrowing point leads to the second exit control flow without traversing the flow control element.

7. The computer program product in accordance with claim 6, wherein if a third value narrowing point is found in the act of attempting to find a value narrowing point, the method further comprises:
- an act of identifying, from the plurality of exit control flows, a third exit control flow that would be taken given the third value narrowing point; and
- an act of modifying the control flow graph such that the flow graph from the third value narrowing point leads to the third exit control flow without traversing the flow control element.

8. The computer program product in accordance with claim 1, wherein if the act of modifying the control flow resulted in one or more unreachable flow elements, the method further comprises:
- an act of removing the one or more unreachable flow elements from the control flow graph.

9. The computer program product in accordance with claim 1, the method being further repeated until the act of traversing evaluates all or some of the control flow graph.

10. The computer program product in accordance with claim 9, wherein the repeated performance of the method allows control equivalency reduction to be performed on the control flow.

11. The computer program product in accordance with claim 9, wherein the repeated performance of the method allows cyclic loop unrolling to be performed on the control flow.

12. The computer program product in accordance with claim 9, wherein the repeated performance of the method allows switch loop shrinking to be performed on the control flow.

13. The computer program product in accordance with claim 9, wherein the repeated performance of the method accomplishes a pass of the flow graph, the pass being repeatedly performed to perform iterative improvement of the control flow.

14. The computer program product in accordance with claim 1, the flow control element being a conditional branch element.

15. The computer program product in accordance with claim 1, the flow control element being a jump table.

16. A method performed by one or more processors for improving a control flow of a software program, the method comprising:
- an act of traversing a control flow graph corresponding to the control flow of the software program;
- as a result of the act of traversing, an act of detecting a flow control element that specifies a plurality of exit control flows that might be taken at runtime depending on a value of a parameter at runtime;
- in response to the act of detecting, an act of finding a value narrowing point in the control flow graph prior to the flow control element such that the value narrowing point narrows the value of the parameter sufficiently that an exit control flow that would be selected by the flow control element is deterministic;
- for a value narrowing point found in the act of finding a value narrowing point, an act of identifying, from the plurality of exit control flows, the exit control flow that would be taken given the found value narrowing point; and
- an act of modifying the control flow such that the control flow graph from the found vale narrowing point leads to the identified exit control flow without traversing the flow control element.

17. The method in accordance with claim 16, the act of modifying the control flow graph comprising:
- an act of identifying an intervening flow of one or more flow graph element in the control flow graph that is between the found value narrowing point and the flow control element excluding the flow control element; and
- an act of adding the intervening flow in the control flow from the found value narrowing point to the identified exit control flow.

18. The method in accordance with claim 16, the found value narrowing point being a first value narrowing point, the identified exit control flow being a first identified exit control flow, the method further comprising:
- an act of finding a second value narrowing point in the control flow graph prior to the flow control element;
- an act of identifying, from the plurality of exit control flows, a second exit control flow that would be taken given the second value narrowing point; and
- an act of modifying the control flow from the second value narrowing point leads to the second exit control flow without traversing the flow control element.

19. The method in accordance with claim 16, further comprising:
- an act of determining that the act of modifying the control flow resulted in one or more unreachable flow elements; and
- in response to the act of determining, an act of removing the one or more unreachable flow elements from the control flow.

20. A computer program product comprising one or more computer-readable hardware storage media having thereon computer-executable instructions that are structured such that, when executed by one or more processors of a computing system, cause the computing system to perform a method for improving a control flow of a software program, the method for improving performed by repeatedly perform a method for attempting to improve a portion of the control flow, the method for attempting to improve a portion of the control flow comprising:
- an act of traversing a control flow graph corresponding to the control flow of the software program;
- as a result of the act of traversing, an act of detecting a flow control element that specifies a plurality of exit control flows that might be taken at runtime depending on a value of a parameter at runtime;
- in response to the act of detecting, an act of attempting to find a value narrowing point in the control flow graph prior to the flow control element such that the value narrowing point narrows the value of the parameter sufficiently that an exit control flow that would be selected by the flow control element is deterministic;
- if a value narrowing point is found in the act of attempting to find a value narrowing point, an act of identifying, from the plurality of exit control flows, the exit control flow that would be taken given the found narrowing point; and an act of modifying the control flow from the found value narrowing point leads to the identified exit control flow without traversing the flow control element, wherein an act of forward traversing for each subsequent performance of the method for attempting to improve a portion of the control flow graph is begun just after the flow control element detected in prior performance of the method for attempting to improve a portion of the control flow graph.

\* \* \* \* \*